United States Patent
Chang et al.

(10) Patent No.: US 9,584,274 B2
(45) Date of Patent: *Feb. 28, 2017

(54) METHOD, SYSTEM AND APPARATUS FOR TRANSMITTING DATA IN CARRIER AGGREGATION MANNER

(71) Applicant: Huawei Technologies Co., Ltd., Shenzhen (CN)

(72) Inventors: Junren Chang, Beijing (CN); Yajuan Li, Beijing (CN); Yongping Zhang, Beijing (CN); Liangliang Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/951,269

(22) Filed: Nov. 24, 2015

(65) Prior Publication Data

US 2016/0087770 A1    Mar. 24, 2016

Related U.S. Application Data

(63) Continuation of application No. 14/017,098, filed on Sep. 3, 2013, now Pat. No. 9,219,584, which is a (Continued)

(30) Foreign Application Priority Data

Mar. 3, 2011    (CN) .......................... 2011 1 0050985

(51) Int. Cl.
*H04W 4/00*    (2009.01)
*H04L 5/00*    (2006.01)
(Continued)

(52) U.S. Cl.
CPC ............ *H04L 5/0044* (2013.01); *H04L 5/001* (2013.01); *H04L 67/1044* (2013.01); *H04W 36/0055* (2013.01)

(58) Field of Classification Search
CPC ... H04L 5/0044; H04L 67/1044; H04L 5/001; H04W 36/0055
(Continued)

(56) References Cited

U.S. PATENT DOCUMENTS

2008/0264813 A1    10/2008  Demange
2010/0296467 A1    11/2010  Pelletier et al.
(Continued)

FOREIGN PATENT DOCUMENTS

| | | |
|---|---|---|
| CN | 101594683 A | 12/2009 |
| CN | 101772179 A | 7/2010 |
| WO | 2010121417 A1 | 10/2010 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.6.0, Dec. 2010, 173 pages.

(Continued)

*Primary Examiner* — Faisal Choudhury
(74) *Attorney, Agent, or Firm* — Slater Matsil, LLP

(57) ABSTRACT

A method, a system and an apparatus can be used for transmitting data in a CA manner. A first base station currently serving a user equipment (UE), creates EPS bearers under different component carriers CC Groups for the UE. The UE sets different access stratum entities corresponding to the CC Groups to process data in the process of creating the EPS bearers. The UE determines, when transmitting or receiving data, a corresponding CC Group (Continued)

| Carrier 1 | Carrier 2 | Carrier 3 | Carrier 4 | Carrier 5 | according to an EPS bearer that bears the data. An access stratum entity corresponding to the CC Group processes the data that needs to be transmitted or received, a site is a first base station currently serving the UE or a second base station currently serving the UE.

9 Claims, 12 Drawing Sheets

Related U.S. Application Data continuation of application No. PCT/CN2012/071705, filed on Feb. 28, 2012.

(51) Int. Cl.
*H04W 36/00* (2009.01)
*H04L 29/08* (2006.01)

(58) Field of Classification Search
USPC .......................................................... 370/329
See application file for complete search history.

(56) References Cited

U.S. PATENT DOCUMENTS

| | | |
|---|---|---|
| 2011/0070907 A1 | 3/2011 | Chou |
| 2011/0134831 A1 | 6/2011 | Pirskanen |
| 2011/0275359 A1* | 11/2011 | Sebire .................... H04L 5/001 455/422.1 |
| 2011/0310986 A1 | 12/2011 | Heo et al. |
| 2012/0039293 A1 | 2/2012 | Feng |
| 2012/0113831 A1 | 5/2012 | Pelletier et al. |
| 2012/0207121 A1* | 8/2012 | Dalsgaard ............. H04L 5/0007 370/329 |
| 2012/0307715 A1 | 12/2012 | Maeda et al. |

OTHER PUBLICATIONS

3rd Generation Partnership Project; Technical Specification Group Radio Access Network; "Evolved Universal Terrestrial Radio Access (E-UTRA); Medium Access Control (MAC) Protocol Specification Release 10)," 3GPP TS 36.321 V10.0.0, Dec. 2010, 53 pages.

"3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331 V10.0.0, Dec. 2010, 276 pages.

"3rd Generation Partnership Project; Technical Specification Group Radio Access Network; Evolved Universal Terrestrial Radio Access Network (E-UTRAN); X2 Application Protocol(X2AP) (Release 10)," 3GPP TS 36.423 V10.0.0, Dec. 2010, 123 pages.

Bonneville, H. et al., "Definitions and Architecutre requirements for supporting Advanced Relay concepts," Aug. 31, 2010, XP55043364, 54 pages.

Extended European Search Report received in Application No. 12752732.3-1505 mailed Mar. 4, 2014, 6 pages.

"International Search Report," International Application No. PCT/CN2012/071705, mailing date: May 17, 2012, 10 pages.

ZTE, "Group DL activation and deactivation," 3GPP TSG RAN WG2 #71, R2-104624, Madrid, Spain, Aug. 23-27, 2010, 5 pages.

\* cited by examiner

| Carrier 1 | Carrier 2 | Carrier 3 | Carrier 4 | Carrier 5 |
FIG. 1
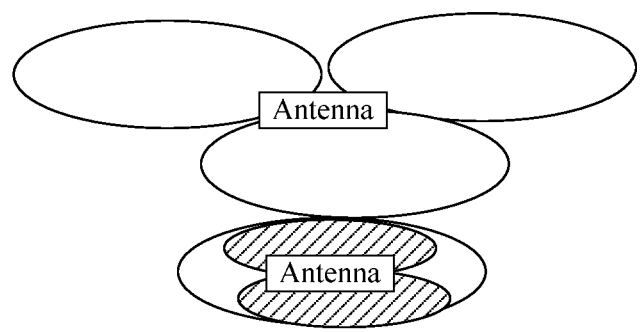
FIG. 2
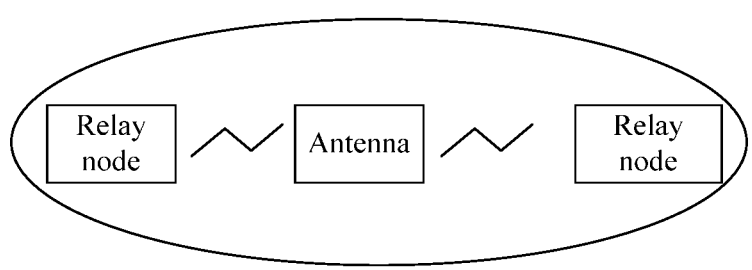
FIG. 3

METHOD, SYSTEM AND APPARATUS FOR TRANSMITTING DATA IN CARRIER AGGREGATION MANNER

CROSS-REFERENCE TO RELATED APPLICATIONS

This application is a continuation of U.S. patent application Ser. No. 14/017,098, filed on Sep. 3, 2013, which is a continuation of International Application No. PCT/CN2012/071705, filed on Feb. 28, 2012. The International Application claims priority to Chinese Patent Application No. 201110050985.5, filed on Mar. 3, 2011. The afore-mentioned patent applications are hereby incorporated by reference in their entireties.

TECHNICAL FIELD

The present invention relates to the field of communications technologies, and in particular, to a method, a system and an apparatus for transmitting data in a carrier aggregation (CA) manner.

BACKGROUND

To support transmission at a peak data rate of up to 1 Gbit/s in a communications system, a Long Term Evolution (LTE) system now uses a CA manner as a method of extending LTE bandwidths. Primarily, the CA manner is to aggregate multiple component carriers (CC) into a carrier of a larger bandwidth to support high-rate data transmission. FIG. 1 is a schematic structural diagram of bandwidths used for transmitting data with a CA technique. As shown in FIG. 1, a downlink channel bandwidth used for transmitting data is a result of aggregating five 20 M carriers including carrier 1, carrier 2, carrier 3, carrier 4, and carrier 5.

CA comes in two types, namely, intra-band carrier aggregation (intra-band CA) and inter-band carrier aggregation (inter-band CA). For intra-band CA, because multiple aggregated carriers are in the same band, their data transmission coverage keeps consistent. For the inter-band CA, because the multiple aggregated carriers are in different bands, when frequencies in a band are far from frequencies of another band, the data transmission coverage varies sharply between the carriers. Generally, carriers in a low band have large coverage, and carriers in a high band have small coverage. As shown in FIG. 2, FIG. 2 is a schematic diagram of coverage of different carriers under inter-band CA in the prior art, a blank region is coverage of an 800 Mhz carrier, and a filled region is coverage of a 3 Ghz carrier. Evidently, the coverage of the 3 Ghz carrier is smaller than the coverage of the 800 Mhz carrier.

As shown in FIG. 2, if a user equipment (UE, User Equipment) is located in a central region of a cell, the UE may use both high-band carriers and low-band carriers in the inter-band CA to transmit data. However, when the UE moves to an edge of the cell, the UE is unable to use high-band carriers for transmitting data. The UE at the edge of the cell has much lower throughput of data transmission than the UE at the center of the cell.

Therefore, to increase the data transmission throughput of the UE at the edge of the cell and expand coverage of the high-band carriers, a relay node (RN, relay Node) or a small base station such as a pico base station or a Home eNB may be used on a network side of the cell to expand the coverage of the high-band carriers. As shown in FIG. 3, which is a schematic structural diagram of expanding coverage of high-band carriers in the prior art, two RNs are added to expand the coverage of the high-band carriers, so as to expand the coverage of the high-band carriers. However, even if the RNs are applied to expand the coverage of the high-band carriers, the UE at the edge of the cell still needs to aggregate carriers from two different sites in order to use both component carriers in the high band and component carriers in the low band. That is, the carriers in the low band come from a macro base station (DeNB, Donor eNodeB), and the carriers in the high band come from the RN or another small base station, which is called inter-site carrier aggregation (inter-site CA) herein.

Therefore, how a UE can aggregate the data transmitted over carriers in different bands of the DeNB and the RN, and improve data transmission throughput of the UE, is an urgent issue to be resolved.

SUMMARY OF THE INVENTION

Embodiments of the present invention provide a method, a system and an apparatus for transmitting data in a CA manner, to enable a UE to receive data that is transmitted over carriers in different bands of different base stations, to improve data transmission throughput of the UE.

The technical solutions of the embodiments of the present invention are implemented in the following way.

A method for transmitting data in a carrier aggregation CA manner is provided in a first embodiment when transmitting or receiving data a user equipment (UE) determines a component carrier group CC Group corresponding to an evolved packet system EPS bearer that bears the data. The CC Group is a CC set possessed by a site that creates the EPS bearer, or a CC set created by the site for the UE. The UE determines an access stratum entity corresponding to the CC Group in at least two access stratum entities according to the CC Group. The data on the access stratum entity is processed corresponding to the CC Group.

An apparatus for transmitting data in a carrier aggregation CA manner includes a scheduling unit and a processing unit. The scheduling unit is configured to, during data transmission or reception, determine a component carrier group CC Group corresponding to an evolved packet system EPS bearer that bears the data. The CC Group is a CC set possessed by a site that creates the EPS bearer or a CC set created by the site for the UE. The scheduling unit is also configured to determine an access stratum entity corresponding to the CC Group in at least two access stratum entities according to the CC Group. The processing unit is configured to determine the access stratum entity corresponding to the CC Group in the at least two access stratum entities to process the data.

Based on the foregoing technical solutions, the UE can determine the corresponding CC group according to different EPS bearers, so that data is scheduled and processed on an access stratum entity corresponding to the CC group. In this way, the UE can receive data that is transmitted over carriers aggregated from different bands of different base stations, and process the data separately, which improves data transmission throughput of the UE.

In another aspect, an embodiment of the present invention provides another method for transmitting data in a carrier aggregation CA manner. A first base station creates a first evolved packet system EPS bearer based on a first component carrier group CC Group for a user equipment UE. The first CC Group is a CC set possessed by the first base station or a CC set created by the first base station for the UE. The first base station instructs a second base station to create a second EPS bearer based on a second CC Group for the UE. The second CC Group is a CC set possessed by the second base station or a CC set created by the second base station for the UE.

A system for transmitting data in a carrier aggregation CA manner includes a first base station currently serving a UE and a second base station currently serving the UE. The first base station currently serving the UE is configured to create a first evolved packet system EPS bearer based on a first component carrier group CC Group. The first CC Group is a CC set possessed by the first base station or a CC set created by the first base station for the UE. The first base station is also configured to instruct the second base station to create a second EPS bearer based on a second CC Group for the UE. The second CC Group is a CC set possessed by the second base station or a CC set created by the second base station for the UE. The first base state is also configured to transmit data to and from the UE by using the created first EPS bearer. The second base station currently serving the UE is configured to create a second EPS bearer for the UE as instructed by the first base station currently serving the UE, and to transmit data to and from the UE by using the created second EPS bearer. The UE is configured to, when transmitting or receiving data, determine a component carrier group CC Group corresponding to an evolved packet system EPS bearer that bears the data, and determine an access stratum entity corresponding to the CC Group in at least two access stratum entities to process the data to be transmitted or received.

An apparatus for transmitting data in a carrier aggregation CA manner includes a creating unit, an instructing unit, and a transmitting unit. The creating unit is configured to create a first evolved packet system EPS bearer based on a first component carrier group CC Group. The first CC Group is a CC set possessed by a first base station or a CC set created by the first base station for a UE. The instructing unit is configured to instruct a second base station to create a second EPS bearer based on a second CC Group for the UE. The second CC Group is a CC set possessed by the second base station or a CC set created by the second base station for the UE. The transmitting unit is configured to transmit data to and from the UE by using the created first EPS bearer.

Different base stations in the embodiments of the present invention create different EPS bearers based on different CC Groups, and use the created different EPS bearers to interact with the UE. In this way, the UE can identify the corresponding CC Group according to the different EPS bearers, which facilitates categorized processing, helps different base stations transmit data to the same UE over carriers in different bands, and improves data transmission throughput of the UE.

BRIEF DESCRIPTION OF THE DRAWINGS

For a more complete understanding of the present invention, and the advantages thereof, reference is now made to the following descriptions taken in conjunction with the accompanying drawing, in which:

FIG. 1 is a schematic structural diagram of bandwidths for transmitting data based on a CA technique in the prior art;

FIG. 2 is a schematic diagram of coverage of different carriers under inter-band CA in the prior art;

FIG. 3 is a schematic diagram of network architecture for expanding coverage of high-band carriers in the prior art;

DETAILED DESCRIPTION OF ILLUSTRATIVE EMBODIMENTS

Figure 4A:
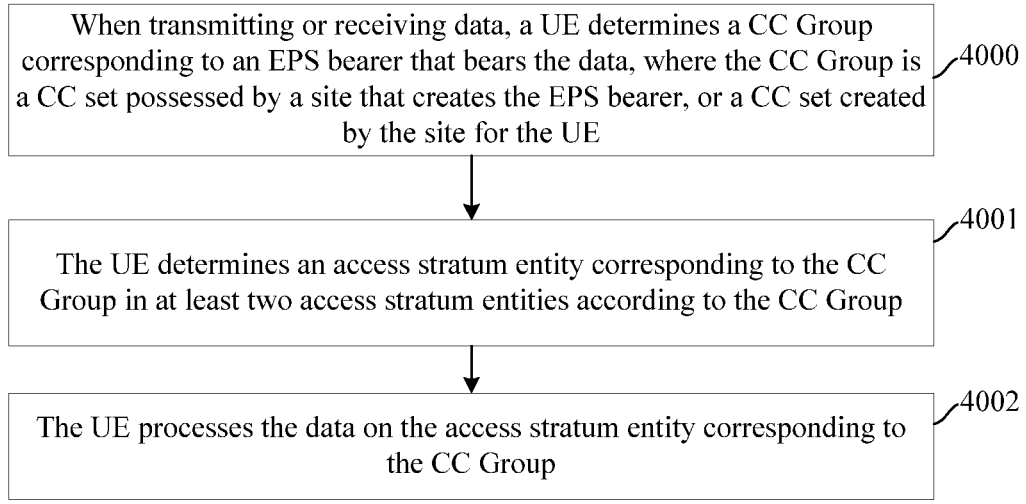
FIG. 4a is a flowchart of a first method for transmitting data in a CA manner according to an embodiment of the present invention.

To make the objectives, technical solutions, and advantages of the present invention more comprehensible, the following further describes the present invention in detail with reference to the accompanying drawings and embodiments.

The linchpin for a UE to aggregate data transmitted over different carriers of a DeNB and an RN and improve data transmission throughput of the UE is: how the UE receives and combines the data from different sites and sends data to different sites. Therefore, when the UE transmits and receives data, a corresponding component carrier group (CC Group) is determined according to an EPS bearer that bears the data, and an access stratum entity corresponding to the CC Group is determined from at least two access stratum entities. The access stratum entity that handles the CC Group processes the data, where the CC Group is a set of one or more CCs or a CC set created by a site for the UE.

Corresponding to the CC Group, the UE sets different access stratum entities for processing the data. In this way, the UE can receive the data that is transmitted over carriers aggregated from different bands of different base stations, and process the data separately, which improves data transmission throughput of the UE.

Correspondingly, different base stations currently serving the UE create different EPS (Evolved Packet System) bearers based on different CC Groups, and use the created different EPS bearers to interact with the UE. In this way, the UE can identify the corresponding CC Group according to the different EPS bearers, and handle the CC Group separately. Therefore, the UE receives the data that is transmitted over carriers aggregated from different bands of different base stations, which improves data transmission throughput of the UE.

The site here refers to the first base station currently serving the UE or the second base station currently serving the UE, and the data processing refers to implementing MAC demultiplexing or multiplexing. In addition, when the data is processed, a radio link control (RLC) layer may be concatenated, segmented, or reassembled. The processing of the data may be only concatenation, segmentation, or reassembly of the RLC layer.

In this way, it is clear how the UE receives and combines data from different sites and transmits data to different sites.

In the embodiment of the present invention, the first base station currently serving the UE may be a DeNB currently serving the UE, and the second base station currently serving the UE may be an RN currently serving the UE. Further, in a heterogeneous network, in addition to the DeNB and the RN, a pico eNB (Pico eNB) and a home eNB (Home eNB) may exist. Therefore, if the RN in the embodiment of the present invention is replaced with the pico eNB and the home eNB, the current EPS bearer of the UE may also be split into different EPS bearers to transmit different data for the UE over the DeNB and the pico eNB when the UE accesses two different base stations. The RN, the Pico eNB, and the Home eNB may be collectively called small base stations.

In the following embodiments, the DeNB currently serving the UE and the RN currently serving the UE are taken as examples.

In the embodiments of the present invention, that the UE sets correspondence between the CC Group and the EPS bearer may be: a site that creates an EPS bearer for the UE sets identifiers of different EPS bearers on the access stratum for the EPS bearers belonging to different CC Groups, for example, a logical channel identifier and/or a data radio bearer (DRB) identifier; and the UE sets correspondence between the identifier of an EPS bearer on the access stratum and the identifier of a CC Group to which the EPS bearer belongs. The identifier of the EPS bearer on the access stratum is carried in a packet header of the data transmitted by the UE, and an access stratum entity of the UE such as a media access control (MAC) identifies the identifier of the EPS bearer on the access stratum, where the identifier of the EPS bearer on the access stratum is carried in the packet header of the data, and then determines a corresponding CC Group identifier and further determine the access stratum entity corresponding to the CC Group that has the CC Group identifier, and the corresponding access stratum entity performs MAC demultiplexing or multiplexing for the data, and performs RLC layer concatenation, segmentation or reassembly.

In the embodiment of the present invention, the CCs from different sites are divided into different CC Groups, that is, different CC Groups correspond to different sites. "CC Group" is hereinafter used instead of the names such as "site". The site here may be a DeNB currently serving the UE or an RN currently serving the UE.

FIG. 4a is a flowchart of a first method for transmitting data in a CA manner according to an embodiment of the present invention. The detailed steps are as follows.

Step 4000: When transmitting or receiving data, a UE determines a CC Group corresponding to an EPS bearer that bears the data, where the CC Group is a CC set possessed by a site that creates the EPS bearer, or a CC set created by the site for the UE.

In this step, correspondence between the CC Group and the EPS bearer is set by the UE.

If the correspondence set by the UE is correspondence between the CC Group identifier and the identifier of the EPS bearer on the access stratum, the identifier of the EPS bearer on the access stratum is uniformly allocated by the DeNB currently serving the UE, and is sent to the UE in the process of creating the EPS bearer with the UE, or may be used by the DeNB currently serving the UE and the RN currently serving the UE and delivered to the UE. Alternatively, the DeNB currently serving the UE and the RN currently serving the UE each set an identifier group of the EPS bearer on the access stratum, and the DeNB currently serving the UE and the RN currently serving the UE each select an identifier in the corresponding identifier group of the EPS bearer on the access stratum, and each deliver the identifier to the UE.

Step 4001: The UE determines an access stratum entity corresponding to the CC Group in at least two access stratum entities according to the CC Group.

Step 4002: The UE processes the data on the access stratum entity corresponding to the CC Group.

In this step, the processing of the data refers to MAC demultiplexing or multiplexing for the data, and/or RLC layer concatenation, segmentation, or reassembly.

The UE in the foregoing embodiment can determine the corresponding CC group according to different EPS bearers, so that data is scheduled and processed on an access stratum entity corresponding to the CC group. In this way, the UE can receive data that is transmitted over carriers aggregated from different bands of different base stations, and perform scheduling and processing, which improves data transmission throughput of the UE. The CC group may include at least one CC. The serving site of the UE in this embodiment may use the CC in the CC group to transmit data to and receive data from the UE over the corresponding EPS bearer.

Figure 4B:
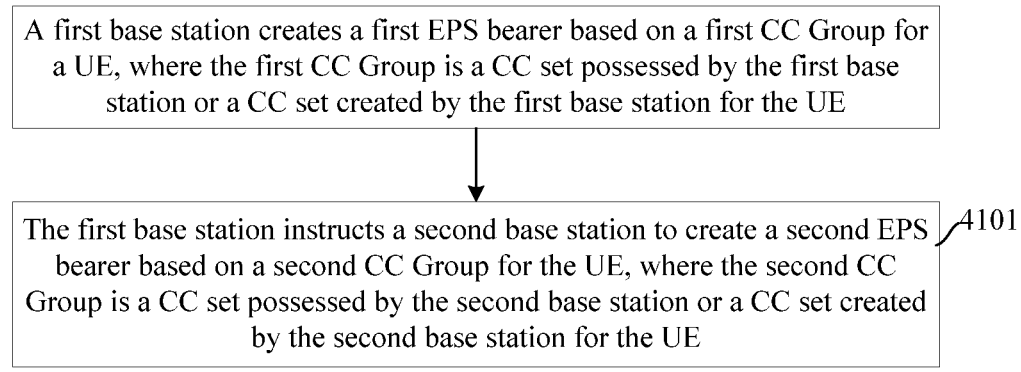
FIG. 4b is a flowchart of a second method for transmitting data in a CA manner according to an embodiment of the present invention.

FIG. 4b is a flowchart of a second method for transmitting data in a CA manner according to an embodiment of the present invention. The detailed steps are as follows:

Step 4100: A first base station creates a first EPS bearer based on a first CC Group for a UE, where the first CC Group is a CC set possessed by the first base station or a CC set created by the first base station for the UE.

Step 4100 is performed under control of a core network entity.

Step 4101: The first base station instructs a second base station to create a second EPS bearer based on a second CC Group for the UE, where the second CC Group is a CC set possessed by the second base station or a CC set created by the second base station for the UE.

In this embodiment, the first base station being a DeNB currently serving the UE and the second base station being an RN currently serving the UE are used as an example for illustration.

In this embodiment, according to the obtained load status of the DeNB currently serving the UE and the RN currently serving the UE and the signal quality, reported by the UE to the DeNB currently serving the UE, of the UE under the DeNB and/or the RN, the DeNB currently serving the UE may determine to create more than one EPS bearer for the UE, and determine whether the more than one EPS bearer is created on the DeNB or the RN.

Before this embodiment, the DeNB currently serving the UE may receive a request sent by a core network entity and intended for creating EPS bearers for the UE, and create EPS bearers under different CC Groups for the UE.

Before this embodiment, the DeNB currently serving the UE may receive a request sent by the RN currently serving the UE and intended for shunting the EPS bearers.

In this embodiment, when the DeNB currently serving the UE creates EPS bearers under different CC Groups for the UE, if the RN currently serving the UE is instructed to create the EPS bearers but the RN currently serving the UE creates the EPS bearers unsuccessfully, the DeNB currently serving the UE may create, for the UE, all or part of the EPS bearers that have been unsuccessfully created by the RN currently serving the UE.

In this embodiment, when the DeNB currently serving the UE creates EPS bearers under different CC Groups for the UE, if the RN currently serving the UE needs to remove an EPS bearer of low priority for a purpose of creating an EPS bearer of high priority for the UE, the removed EPS bearer of low priority may be created on the DeNB currently serving the UE as instructed by the core network entity or according to information fed back by the RN currently serving the UE; or, if the DeNB currently serving the UE needs to remove an EPS bearer of low priority for a purpose of creating an EPS bearer of high priority for the UE, the removed EPS bearer of low priority may be created on the RN currently serving the UE. In this case, the RN currently serving the UE (or the DeNB currently serving the UE) sends the data, whose transmission is unfinished yet, on the removed EPS bearer of low priority to the DeNB currently serving the UE (or the RN currently serving the UE).

Different base stations in the embodiment of the present invention create different EPS bearers based on different CC Groups for the UE, and use the created different EPS bearers to exchange data with the UE. In this way, the UE can identify the corresponding CC Group according to the different EPS bearers, which facilitates categorized processing, helps different base stations transmit data to the same UE over carriers in different bands, and improves data transmission throughput of the UE. Especially, when one of the different base stations needs to remove the EPS bearer of low priority when creating an EPS bearer, another base station may create the EPS bearer of low priority instead. Therefore, the creation of the EPS bearer is more flexible, different sites serve the UE through carrier aggregation, and the quality of service is improved. Understandably, in this embodiment and subsequent embodiments, the EPS bearer of low priority on a site refers to a bearer whose priority level is lower than the priority level of the EPS bearer to be created by the site. The priority level may depend on a service requirement. For example, a bearer related to an important or urgent service generally has higher priority.

Figure 5:
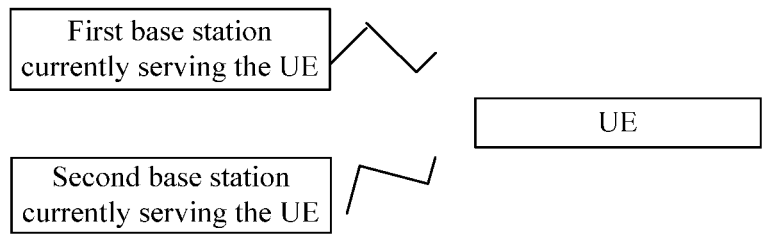
FIG. 5 is a schematic structural diagram of a system for transmitting data in a CA manner according to an embodiment of the present invention.

FIG. 5 is a schematic structural diagram of a system for transmitting data in a CA manner according to an embodiment of the present invention. The system includes a first base station currently serving a UE, the UE, and a second base station currently serving the UE.

The first base station currently serving the UE is configured to: create a first evolved packet system EPS bearer based on a first component carrier group CC Group, where the first CC Group is a CC set possessed by the first base station or a CC set created by the first base station for the UE; instruct a second base station to create a second EPS bearer based on a second CC Group for the UE, where the second CC Group is a CC set possessed by the second base station or a CC set created by the second base station for the UE; and transmit data to and from the UE by using the created first EPS bearer.

The second base station currently serving the UE is configured to create a second EPS bearer for the UE as instructed by the first base station currently serving the UE, and transmit data to and from the UE by using the created second EPS bearer.

The UE is configured to: when transmitting or receiving data, determine a component carrier group CC Group corresponding to an evolved packet system EPS bearer that bears the data, and determine an access stratum entity corresponding to the CC Group in at least two access stratum entities to process the data to be transmitted or received.

In this embodiment, the first base station currently serving the UE is further configured to: under control of a core network entity or after receiving a shunt request from the second base station currently serving the UE, create the first EPS bearer for the UE and instruct the second base station to create the second EPS bearer.

In this embodiment, the first base station currently serving the UE is further configured to: if the second base station currently serving the UE needs to remove EPS bearers of low priority for a purpose of creating a second EPS bearer for the UE, create all or part of the EPS bearers of low priority on the first base station itself.

Figure 6A:
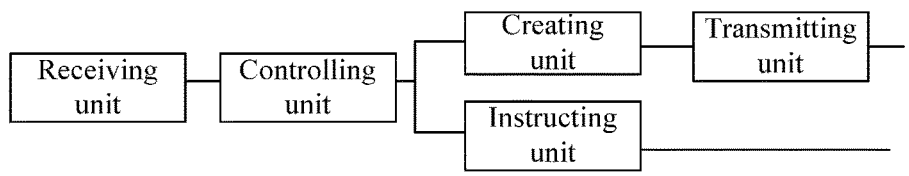
FIG. 6a is a schematic diagram of a first structure of an apparatus for transmitting data in a CA manner according to an embodiment of the present invention.

FIG. 6a is a schematic diagram of a first structure of an apparatus for transmitting data in a CA manner according to an embodiment of the present invention. The apparatus is a DeNB, and includes a creating unit, an instructing unit, and a transmitting unit.

The creating unit is configured to create a first evolved packet system EPS bearer based on a first component carrier group CC Group, where the first CC Group is a CC set possessed by a first base station or a CC set created by the first base station for a UE.

The instructing unit is configured to instruct a second base station to create a second EPS bearer based on a second CC Group for the UE, where the second CC Group is a CC set possessed by the second base station or a CC set created by the second base station for the UE.

The transmitting unit is configured to transmit data to and from the UE by using the created first EPS bearer.

This embodiment further includes a receiving unit and a controlling unit.

The receiving unit is configured to receive a control instruction sent by a core network entity or a shunt request sent by the second base station currently serving the UE, and send the control instruction or shunt request to the controlling unit.

The controlling unit is configured to control the creating unit and the instructing unit, to create the first EPS bearer and instruct to create the second EPS bearer.

In this embodiment, the creating unit further includes a creating subunit, configured to: if the second base station currently serving the UE needs to remove EPS bearers of low priority for a purpose of creating a second EPS bearer for the UE, create all or part of the EPS bearers of low priority.

Figure 6B:
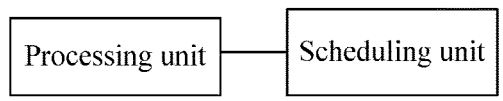
FIG. 6b is a schematic diagram of a second structure of an apparatus for transmitting data in a CA manner according to an embodiment of the present invention.

FIG. 6b is a schematic diagram of a second structure of an apparatus for transmitting data in a CA manner according to an embodiment of the present invention. The apparatus is a UE, and includes a scheduling unit and a processing unit.

The scheduling unit is configured to, during data transmission or reception, determine a component carrier group CC Group corresponding to an evolved packet system EPS bearer that bears the data. The CC Group is a CC set possessed by a site that creates the EPS bearer or a CC set created by the site for the UE. The scheduling unit is also configured to determine an access stratum entity corresponding to the CC Group in at least two access stratum entities according to the CC Group.

The processing unit is configured to determine the access stratum entity corresponding to the CC Group in the at least two access stratum entities to process the data.

In this embodiment, the processing unit is further configured to demultiplex or multiplex the data on a media access control MAC layer corresponding to the CC Group; and/or concatenate, segment, or reassemble the data on a radio link control RLC layer corresponding to the CC Group.

Figure 7:
FIG. 7 is a schematic diagram of a system for transmitting data in a CA manner according to Embodiment 1 of the present invention.
Figure 7:
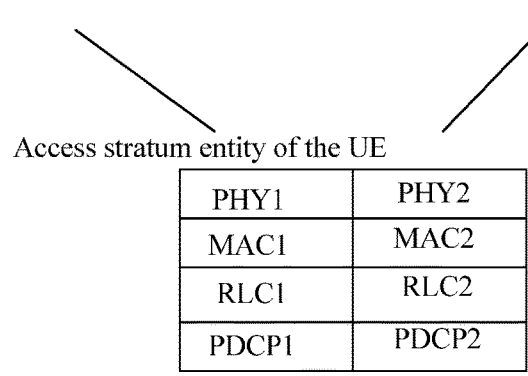
Figure 7:
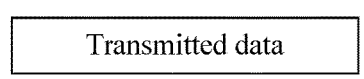

FIG. 7 is a schematic diagram of a system for transmitting data in a CA manner according to Embodiment 1 of the present invention. The system includes a DeNB currently serving a UE. The CC Group of the DeNB is CC Group 1, that is, CC 1 and CC 2 make up CC Group 1. The system also includes an RN currently serving the UE. The CC Group of the RN is CC Group 2, that is, CC 3 and CC 4 make up CC Group 2. The UE includes access stratum entities and higher layer entities, where the access stratum entities include a physical layer entity (PHY), a media access control entity (MAC), an RLC entity, and a Packet Data Convergence Protocol (PDCP) entity in sequence. The UE sets CC Group 1 to correspond to CC 1 and CC 2, sets CC Group 2 to correspond to CC 3 and CC 4, sets CC Group 1 to correspond to access stratum entities PHY 1, MAC 1, RLC 1, and PDCP 1, and sets CC Group 2 to correspond to access stratum entities PHY 2, MAC 2, RLC 2, and PDCP 2. Specially, PDCP 1 and PDCP 2 may be combined into one PDCP entity in the UE. In this way, when the UE transmits or receives data, the UE determines the corresponding CC Group according to the EPS bearer that bears the data, and the access stratum entity of the CC Group concatenates, segments and/or reassembles the data, and further performs demultiplexing or multiplexing, and so on, which are collectively called data processing. That is, the data processing refers to MAC demultiplexing or multiplexing, and RLC layer concatenation, segmentation or reassembly for the data. If the data is transmitted over CC 1 or CC 2, which corresponds to CC Group 1, the enforcement access stratum entity MAC 1 of CC Group 1 multiplexes or demultiplexes the data, and RLC 1 concatenates, segments and/or reassembles the data. If the data is transmitted over CC 3 or CC 4, which corresponds to CC Group 2, the enforcement access stratum entity MAC 2 of CC Group 2 multiplexes or demultiplexes the data, and RLC 2 concatenates, segments and/or reassembles the data.

Figure 8:
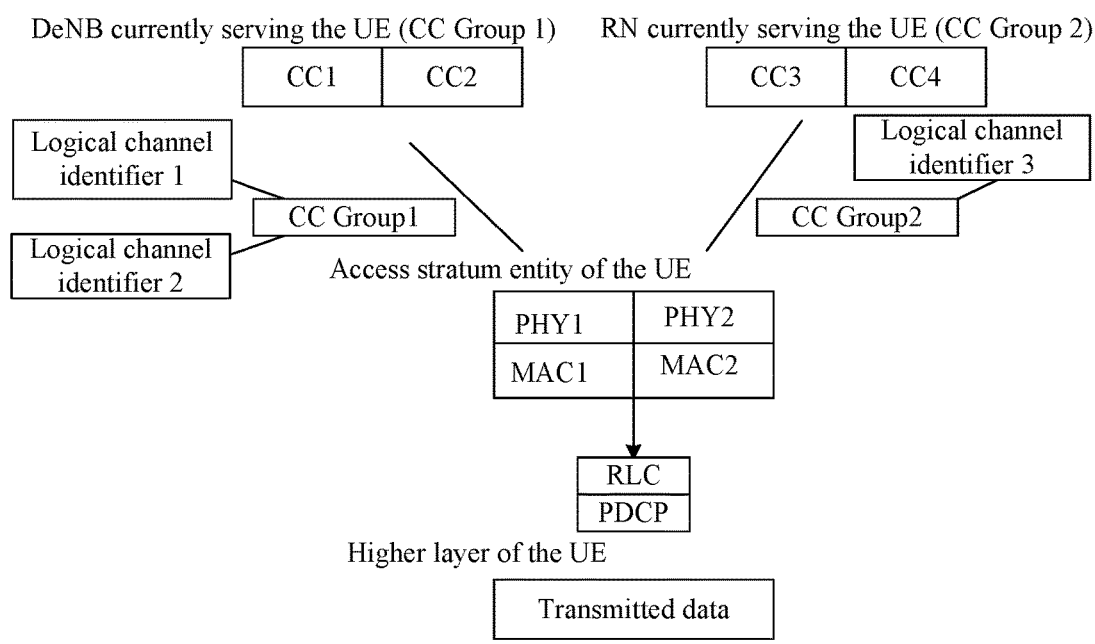
FIG. 8 is a schematic diagram of a system for transmitting data in a CA manner according to Embodiment 2 of the present invention.

FIG. 8 is a schematic diagram of a system for transmitting data in a CA manner according to Embodiment 2 of the present invention. The system includes a DeNB currently serving a UE. The CC Group of the DeNB is CC Group 1, two EPS bearers, namely, EPS bearer 1 and EPS bearer 2, of the UE are created on CC 1 Group 1, and logical channel identifier 1 and logical channel identifier 2 are allocated to the two EPS bearers, respectively. That is, according to the logical channel identifier allocated by a network to the EPS bearer of the UE, the UE can determine on which CC Group the EPS bearer is created. The system also includes an RN currently serving the UE. The CC Group of the RN is CC Group 2. That is, CC 3 and CC 4 make up CC Group 2. On CC Group 2, the UE creates an EPS bearer, and allocates logical channel identifier 3 to the EPS bearer. The UE includes access stratum entities and higher layer entities, where the access stratum entities include PHY, MAC, RLC, and PDCP in sequence. The UE sets logical channel identifier 1 and logical channel identifier 2 to correspond to CC Group 1, sets logical channel identifier 3 to correspond to CC Group 2, sets CC Group 1 to correspond to access stratum entities PHY 1, MAC 1, and RLC, and sets CC Group 2 to correspond to access stratum entities PHY 2, MAC 2, and the RLC. In this way, when the UE transmits or receives data, according to the logical channel identifier carried in a packet header of the data, the UE can determine the CC Group to which the EPS bearer that bears the data belongs, and the access stratum entity corresponding to the CC Group performs MAC demultiplexing or multiplexing, and RLC layer concatenation, segmentation and/or reassembly, and so on, for the data. That is, if the packet header of the data carries logical channel identifier 1 or logical channel identifier 2, which corresponds to CC Group 1, the access stratum entities PHY 1 and MAC 1 corresponding to CC Group 1 multiplex or demultiplex the data, and the access stratum entity RLC corresponding to CC Group 1 performs concatenation, segmentation, and/or reassembly, and so on; and, if the packet header of the data carries logical channel identifier 3, which corresponds to CC Group 2, the access stratum entities PHY 2 and MAC 2 corresponding to CC Group 2 multiplex or demultiplex the data, and the access stratum entity RLC corresponding to CC Group 2 performs concatenation, segmentation, and/or reassembly, and so on.

It should be noted that, for ease of description, the access stratum entities corresponding to CC 1 Group1 are expressed as PHY 1, MAC 1, RLC 1, and PDCP 1, and the access stratum entities corresponding to CC 2 Group 2 are expressed as PHY 2, MAC 2, RLC 2, and PDCP 2. To put it simply, the UE groups the data on the access stratum entities of the UE according to the CC Group corresponding to the EPS bearer that bears the packet. That is, based on the CC Group, the UE performs grouped MAC multiplexing/demultiplexing of the data, and performs grouped concatenation, segmentation and/or reassembly of the RLC. Such grouped processing may be logical grouped processing performed through software or physical grouped processing performed through hardware, which is not limited herein.

The following gives detailed description about the process of creating an EPS bearer with reference to several specific embodiments.

Figure 9:
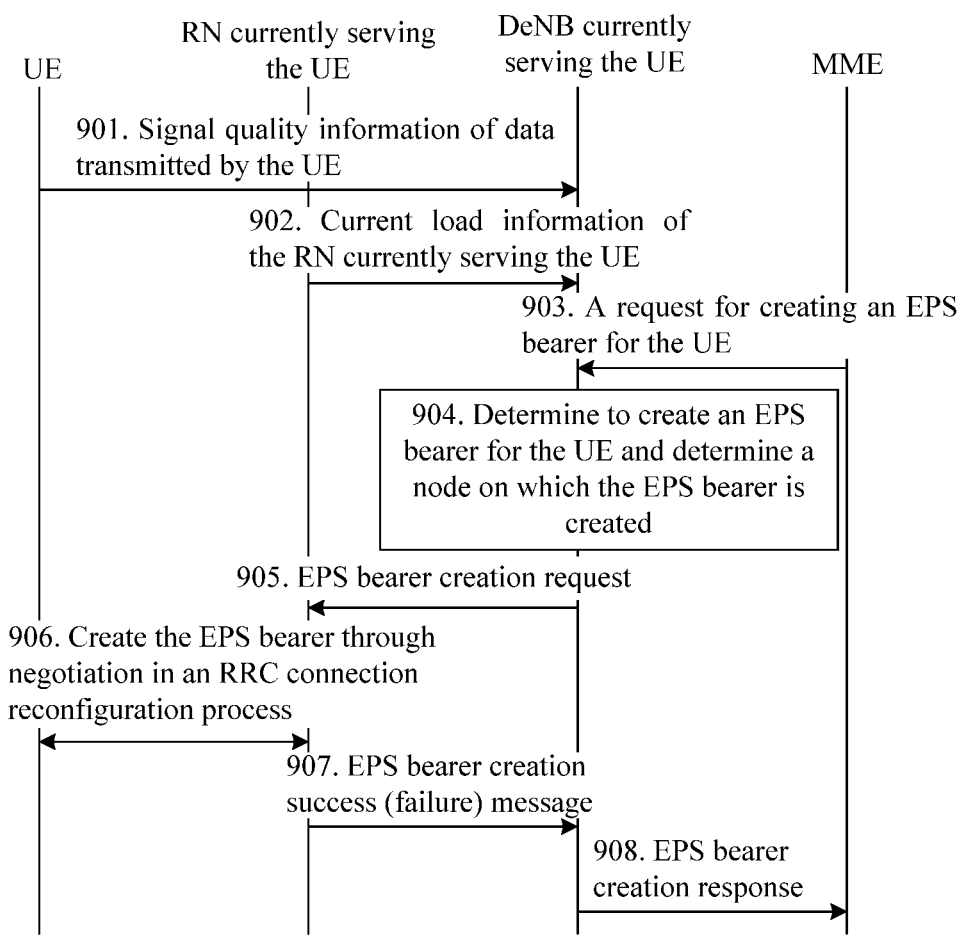
FIG. 9 is a flowchart of a method for a DeNB currently serving a UE to create an EPS bearer for the UE in a CA manner according to Embodiment 1 of the present invention.

FIG. 9 is a flowchart of a method for a DeNB currently serving a UE to create an EPS bearer for the UE in a CA manner according to one embodiment (Embodiment 1) of the present invention. The method includes the following steps.

Step 901: A DeNB currently serving a UE receives signal quality information of data transmitted by the UE.

In this step, the signal quality information is detected and reported by the UE (indicated in the drawing that it is sent by the UE), or detected and reported by an RN, specifically including signal quality information of each cell controlled by the RN, or is signal quality information of a serving cell under the RN as selected by the UE.

In this step, the signal quality information may also be overall average signal quality information under all cells of the UE that are undertaken by the RN currently serving the UE, or may be overall average signal quality information of serving cells selected by the UE among all the cells undertaken by the RN currently serving the UE.

Step 902: The RN currently serving the UE sends current load status information of the RN currently serving the UE to the DeNB currently serving the UE.

Step 903: A mobility management entity (MME) sends, to the DeNB currently serving the UE, a request for creating an EPS bearer for the UE.

In this step, the request for creating an EPS bearer for the UE may also be sent by another core network entity such as a serving gateway (S-GW) or a public data network gateway (PDN-GW, Public Data Network) to the DeNB currently serving the UE.

Step 904: After receiving the request, the DeNB currently serving the UE determines to create an EPS bearer for the UE according to one or more of the load of the DeNB itself and the load information of the RN currently serving the UE and signal quality information reported by the UE, and determines a node on which the EPS bearer is created.

In this step, it is assumed that the DeNB determines to create the EPS bearer onto the RN currently serving the UE.

Step 905: The DeNB currently serving the UE sends an EPS bearer creation request to the RN currently serving the UE.

Step 906: After receiving the request, the RN currently serving the UE creates the EPS bearer through negotiation with the UE in an RRC connection reconfiguration process.

Step 907: The RN currently serving the UE determines whether creating the EPS bearer for the UE is succeeded or failed. If succeeded, the RN feeds back an EPS bearer creation success message to the DeNB currently serving the UE; otherwise, the RN feeds back an EPS bearer creation failure message to the DeNB currently serving the UE.

Step 908: The DeNB currently serving the UE receives the EPS bearer creation message fed back by the RN currently serving the UE. If the message is an EPS bearer creation success message, the DeNB sends an EPS bearer creation response to the MME directly. If the message is an EPS bearer creation failure message, the DeNB currently serving the UE decides whether to accept or partly accept the EPS bearers that are unsuccessfully created on the RN currently serving the UE. If none of the EPS bearers is accepted, the DeNB feeds back an EPS bearer creation failure response to the MME. If all of the EPS bearers are accepted, the DeNB sends an EPS bearer creation response to the MME after the EPS bearers are created with the UE in an RRC connection reconfiguration process. If a part of the EPS bearers are accepted, the DeNB sends an EPS bearer creation response to the MME after the part of the EPS bearers are created with the UE in an RRC connection reconfiguration process, where the response carries information about the part of successfully created EPS bearers and/or information about the part of uncreated EPS bearers.

Figure 10:
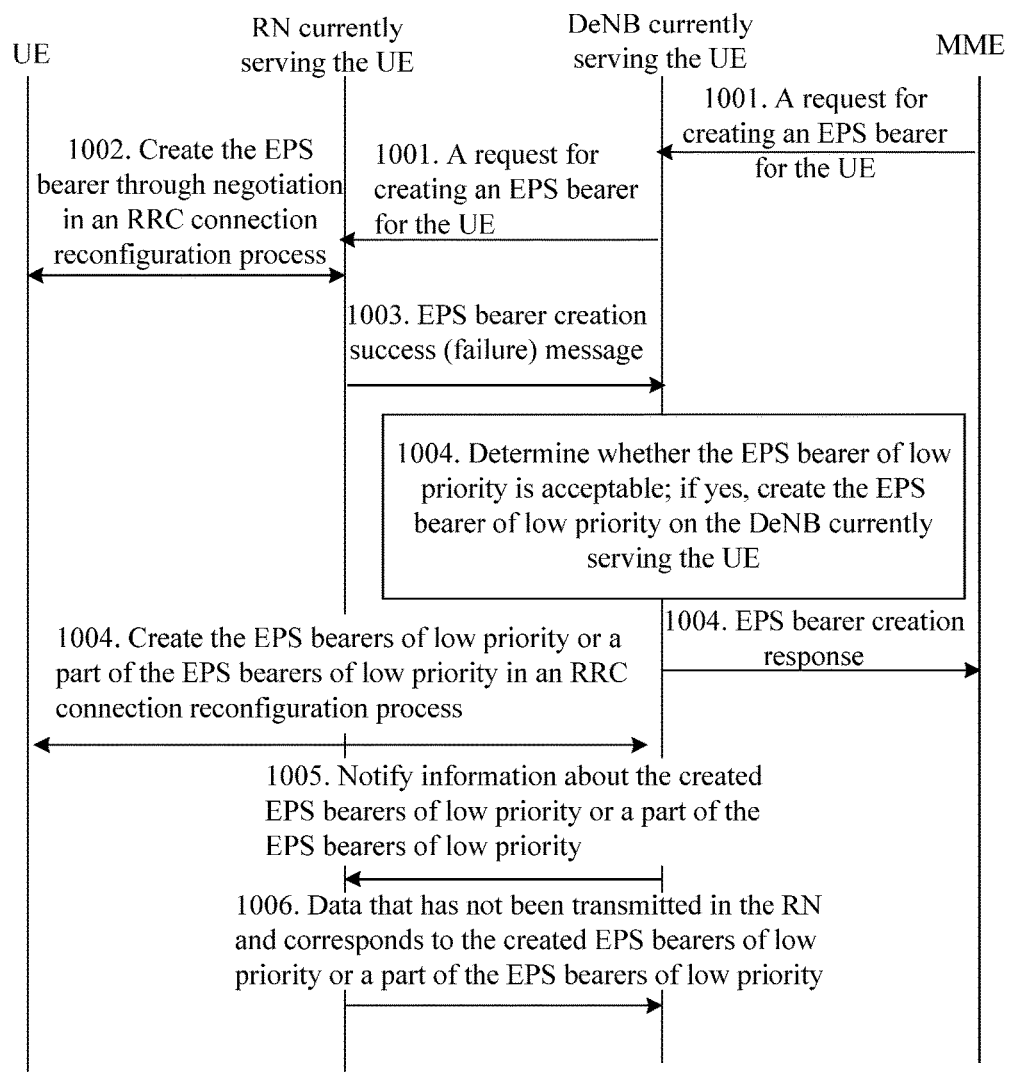
FIG. 10 is a flowchart of a method for a DeNB currently serving a UE to create an EPS bearer for the UE in a CA manner according to Embodiment 2 of the present invention.

FIG. 10 is a flowchart of a method for a DeNB currently serving a UE to create an EPS bearer for the UE in a CA manner according to another embodiment (Embodiment 2) of the present invention. The method includes the following:

Step 1001: Through a DeNB currently serving a UE, an MME sends an EPS bearer creation request to an RN currently serving the UE, where the request carries a Pre-emption indication indicating that the MME instructs an access network entity to remove an EPS bearer of low priority and create a currently requested EPS bearer when data transmission resources are limited.

In this step, the request for creating an EPS bearer for the UE may also be sent by another core network entity such as an S-GW or a PDN-GW to the DeNB currently serving the UE.

Step 1002: After receiving the request, the RN currently serving the UE creates the EPS bearer through negotiation with the UE in an RRC connection reconfiguration process. In this process, the EPS bearer is created for the UE, and a certain EPS bearer of low priority is removed.

Step 1003: The RN currently serving the UE feeds back an EPS bearer creation success message to the DeNB currently serving the UE, where the message carries information about the removed EPS bearer of low priority.

Step 1004: The DeNB currently serving the UE determines whether the removed EPS bearer of low priority is acceptable, if yes, creates the EPS bearer of low priority on the DeNB currently serving the UE, and sends an EPS bearer creation success message to the MME, if no, forwards, to the MME, an EPS bearer creation success message fed back by the RN currently serving the UE, where the message carries information about the removed EPS bearer of low priority; and the DeNB currently serving the UE and the UE create the EPS bearers of low priority or a part of the EPS bearers of low priority in an RRC connection reconfiguration process.

In this step, if there are multiple EPS bearers of low priority, the DeNB currently serving the UE accepts only a part of them, and the part of the EPS bearers of low priority that are removed by the RN are created on the DeNB currently serving the UE, and then an EPS bearer creation response is fed back to the MME, where the response carries information about the EPS bearers of low priority that are removed by the RN and impracticable for creation.

In this step, after the EPS bearer of low priority is created on the DeNB for the UE, correspondingly, the UE needs to update a mapping relationship between the bearer of low priority and a CC Group or a creating site.

Step 1005: The DeNB currently serving the UE notifies information about the created EPS bearers of low priority or a part of the EPS bearers of low priority to the RN currently serving the UE.

Step 1006: After receiving the notification, the RN currently serving the UE forwards data whose transmission or reception is unfinished in the RN to the DeNB currently serving the UE, where the data corresponds to the created EPS bearers of low priority or a part of the EPS bearers of low priority.

In this step, if the created EPS bearers of low priority or the part of the EPS bearers of low priority employ an RLC AM mode, which should be a confirmation mode, the data whose transmission is unfinished includes the data whose correct receiving is not confirmed by the UE and the data which is not sent to the UE; if an UM mode is applied, which should be a non-confirmation mode, the data whose transmission is unfinished includes the data which is not sent to the UE.

In another embodiment (Embodiment 3), a DeNB currently serving a UE exercises centralized control on the removal of the EPS bearers of low priority on an RN currently serving the UE.

Figure 11:
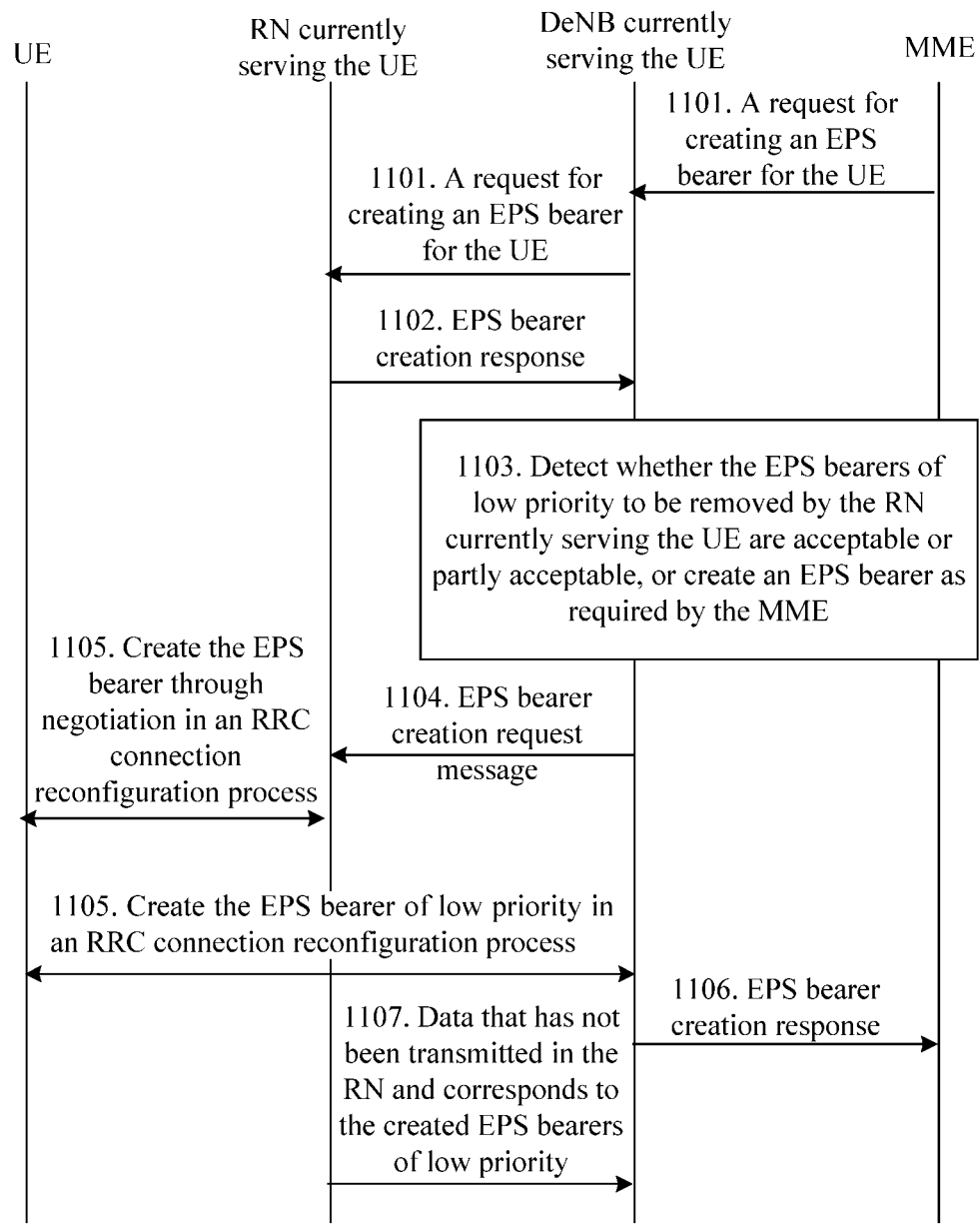
FIG. 11 is a flowchart of a method for a DeNB currently serving a UE to create an EPS bearer for the UE in a CA manner according to Embodiment 3 of the present invention.

FIG. 11 is a flowchart of a method for a DeNB currently serving a UE to create an EPS bearer for the UE in a CA manner according to Embodiment 3 of the present invention. The method includes the following:

Step 1101: Through a DeNB currently serving a UE, an MME sends an EPS bearer creation request to an RN currently serving the UE, where the request carries a Pre-emption indication indicating that the MME instructs an access network entity to remove an EPS bearer of low priority and create a currently requested EPS bearer when data transmission resources are limited.

Step 1102: The RN currently serving the UE determines that its own EPS bearer of low priority needs to be removed, and feeds back an EPS bearer creation response to the DeNB currently serving the UE, where the response carries an EPS Pre-emption indication indicating removal of its own EPS bearer of low priority. Optionally, the message may carry an identifier of the to-be-removed EPS bearer on an access stratum.

Step 1103: The DeNB currently serving the UE detects whether the EPS bearers of low priority to be removed by the RN currently serving the UE are acceptable or partly acceptable, or creates an EPS bearer as required by the MME.

Step 1104: If the DeNB currently serving the UE can create the EPS bearer as required by the MME, the DeNB sends an EPS bearer retain request message to the RN currently serving the UE, where the message instructs the RN currently serving the UE not to execute the EPS bearer creation request (not illustrated in the drawing) previously sent by the DeNB. If the DeNB can accept the EPS bearer of low priority to be removed by the RN currently serving the UE, the DeNB sends an EPS bearer creation request message to the RN currently serving the UE, instructing to create an EPS bearer for the UE, where the message carries an identifier of the EPS bearer, accepted by the DeNB currently serving the UE, of low priority on the access stratum.

If the DeNB currently serving the UE can create the EPS bearer as required by the MME, the DeNB currently serving the UE and the UE create the EPS bearer for the UE in an RRC connection reconfiguration process (not illustrated in the drawing).

Step 1105: If the DeNB currently serving the UE accepts the EPS bearer of low priority to be removed by the RN currently serving the UE, the DeNB currently serving the UE and the UE create, in an RRC connection reconfiguration process, the accepted EPS bearer of low priority to be removed by the RN currently serving the UE; and the RN currently serving the UE and the UE create an EPS bearer for the UE in an RRC connection reconfiguration process, and remove the EPS bearer of low priority that is accepted by the DeNB currently serving the UE and is to be removed from the RN currently serving the UE.

In this step, correspondingly, the UE needs to update a mapping relationship between the bearer of low priority and a CC Group or a creating node.

Step 1106: The DeNB currently serving the UE sends an EPS bearer creation success response to the MME.

Step 1107: The RN currently serving the UE forwards data whose transmission or reception is unfinished in the RN to the DeNB currently serving the UE, where the data corresponds to the accepted EPS bearers of low priority.

In this step, if the created EPS bearers of low priority employ an RLC AM mode, the data whose transmission is unfinished includes the data whose correct receiving is not confirmed by the UE and the data which is not sent to the UE; if an UM mode is applied, the data whose transmission is unfinished includes the data which is not sent to the UE.

In another embodiment (Embodiment 4), a process for an RN currently serving a UE to request a DeNB currently serving the UE to shunt created EPS bearers is similar to a process for the DeNB currently serving the UE to request the RN currently serving the UE to shunt created EPS bearers.

Figure 12:
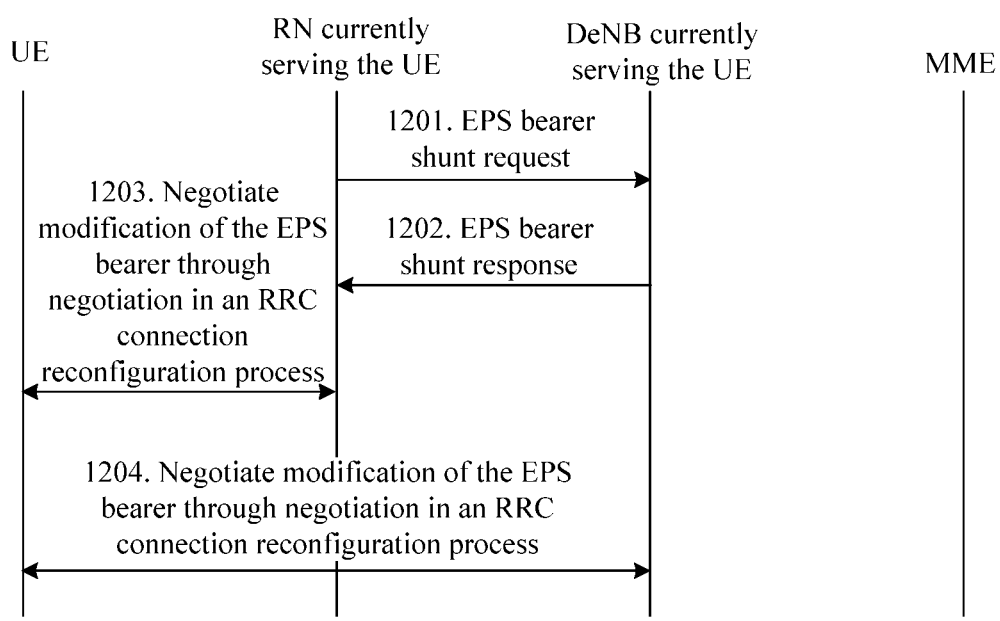
FIG. 12 is a flowchart of a method for a DeNB currently serving a UE to create an EPS bearer for the UE in a CA manner according to Embodiment 4 of the present invention.

FIG. 12 is a flowchart of a method for a DeNB currently serving a UE to create an EPS bearer for the UE in a CA manner according to Embodiment 4 of the present invention. The method includes the following steps.

Step 1201: An RN currently serving a UE sends an EPS bearer shunt request to a DeNB currently serving the UE, where the request carries an identifier of the shunted EPS bearer in a core network, or carries the number of EPS bearers to be shunted as requested, or carries throughput of data to be shunted as requested.

Step 1202: The DeNB currently serving the UE sends an EPS shunt response to the RN currently serving the UE, where the response carries an identifier of the accepted shunted EPS bearer in the core network.

Step 1203: The RN currently serving the UE and the UE negotiate modification of the EPS bearer in an RRC connection reconfiguration process. Correspondingly, the UE needs to update a mapping relationship between the shunted EPS bearer and a CC Group or a creating node. The RN forwards data whose transmission is unfinished in the RN to the DeNB currently serving the UE, where the data corresponds to the EPS bearer shunted by the DeNB currently serving the UE.

In this step, if the shunted EPS bearer employs an RLC AM mode, the data whose transmission is unfinished includes the data whose correct receiving is not confirmed by the UE, and the data which is not sent to the UE; if an UM mode is applied, the data whose transmission is unfinished includes the data which is not sent to the UE.

Step 1204: The DeNB currently serving the UE and the UE negotiate modification of the EPS bearer in an RRC connection reconfiguration process, and create the EPS bearer on the DeNB currently serving the UE, where the EPS bearer is shunted from the RN currently serving the UE. Correspondingly, the UE needs to update a mapping relationship between the shunted EPS bearer and a CC Group or a creating node.

In the foregoing embodiment, it is assumed that the RN currently serving the UE requests the DeNB currently serving the UE to shunt EPS bearers, and a process for the DeNB currently serving the UE to request the RN currently serving the UE to shunt EPS bearers is similar.

In another embodiment (Embodiment 5), a core network entity controls a DeNB currently serving a UE to create an EPS bearer for the UE on the DeNB currently serving the UE and on an RN currently serving the UE.

Figure 13:
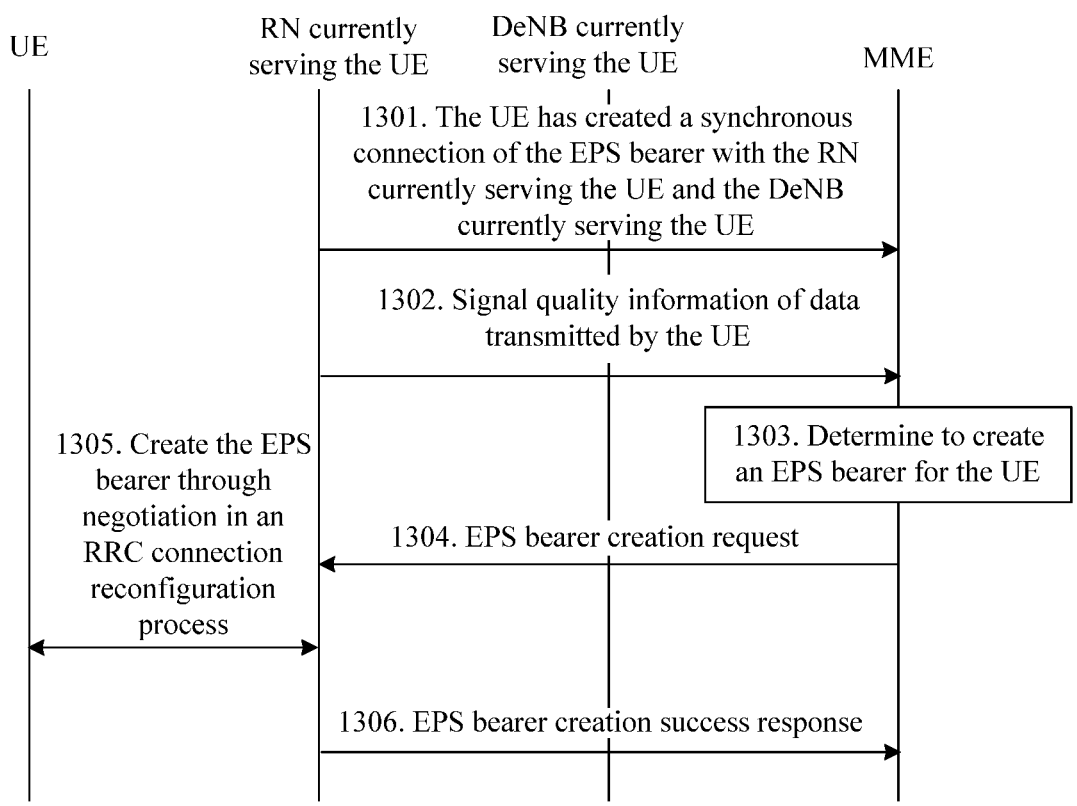
FIG. 13 is a flowchart of a method for a DeNB currently serving a UE to create an EPS bearer for the UE in a CA manner according to Embodiment 5 of the present invention.

FIG. 13 is a flowchart of a method for a DeNB currently serving a UE to create an EPS bearer for the UE in a CA manner according to Embodiment 5 of the present invention. The method includes the following steps.

Step 1301: An MME receives a notification indicating that the UE has created a synchronous connection with the RN currently serving the UE and the DeNB currently serving the UE.

In this embodiment, the notification may be sent by the RN currently serving the UE.

In this step, the notification may also be received by another core network entity, which is not limited herein.

Step 1302: The MME receives signal quality information of data transmitted by the UE, including the signal quality information of the data transmitted by the RN currently serving the UE and load information, and the signal quality information of the data transmitted by the DeNB currently serving the UE and load information.

Specifically, the signal quality information of the data transmitted by the RN currently serving the UE is: overall average signal quality information under all cells undertaken by the RN currently serving the UE, or may be overall average signal quality information of serving cells selected by the UE among all the cells undertaken by the RN currently serving the UE.

In this step, the signal quality information may also be overall average signal quality information of data transmitted by the RN currently serving the UE to all EPS bearers created for the UE, or average signal quality information of all EPS bearers in a serving cell which are created for the UE by the RN currently serving the UE, where the RN currently serving the UE is selected by the UE.

As regards the signal quality information of the data transmitted by the DeNB currently serving the UE and the load information, the processing is similar to the above process, and is not repeated here any further.

Step 1303: The MME determines to create an EPS bearer for the UE according to received information, and determines whether the EPS bearer created for the UE resides on the DeNB currently serving the UE and/or the RN currently serving the UE.

In this step, it is assumed that the MME determines that the EPS bearer created for the UE resides on the RN currently serving the UE.

Step 1304: Through the DeNB currently serving the UE, the MME sends an EPS bearer creation request to the RN currently serving the UE.

Step 1305: After receiving the request, the RN currently serving the UE creates the EPS bearer through negotiation with the UE in an RRC connection reconfiguration process, and the creation succeeds.

Step 1306: The RN currently serving the UE sends an EPS bearer creation success response to the DeNB, and the DeNB forwards the response to the MME.

In this embodiment (Embodiment 6), a DeNB uniformly controls allocation of a data radio bearer (DRB) identifier and/or a logical channel identifier corresponding to an EPS bearer.

Figure 14:
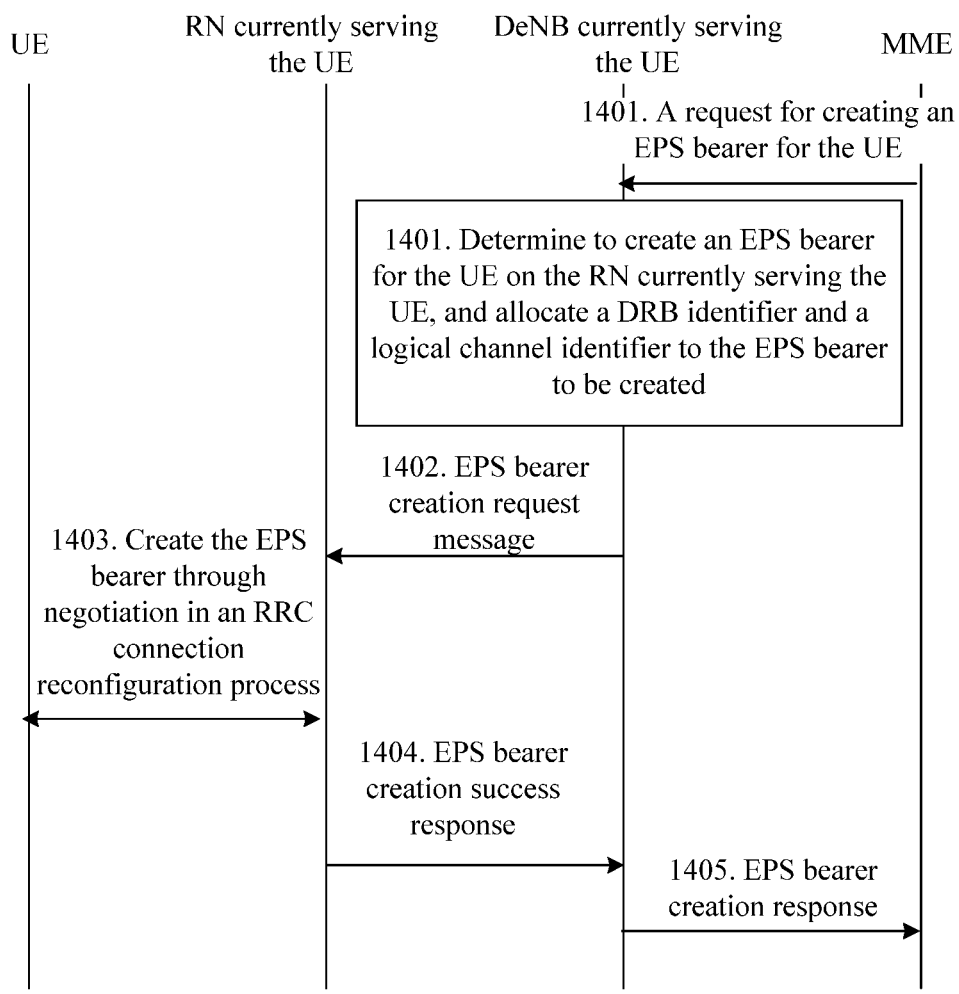
FIG. 14 is a flowchart of a method for a DeNB currently serving a UE to create an EPS bearer for the UE in a CA manner according to Embodiment 6 of the present invention.

FIG. 14 is a flowchart of a method for a DeNB currently serving a UE to create an EPS bearer for the UE in a CA manner according to Embodiment 6 of the present invention. The method includes the following:

Step 1401: A DeNB currently serving a UE receives an EPS bearer creation request from an MME, determines to create an EPS bearer for the UE on an RN currently serving the UE, and allocates a DRB identifier and/or a logical channel identifier to the EPS bearer to be created.

Step 1402: The DeNB currently serving the UE sends an EPS bearer creation request to the RN currently serving the UE, where the request includes the DRB identifier and/or the logical channel identifier allocated to the EPS bearer to be created.

Step 1403: The RN currently serving the UE and the UE create an EPS bearer for the UE in an RRC connection reconfiguration process in which the UE sets correspondence between an identifier of a CC Group to which the EPS bearer belongs and a DRB identifier and/or logical channel identifier of the EPS bearer; and corresponding to the CC Group, different access stratum entities are set to multiplex or demultiplex, and concatenate, segment and/or reassemble a packet.

Step 1404: The RN currently serving the UE sends an EPS bearer creation success response to the DeNB currently serving the UE.

Step 1405: The DeNB currently serving the UE sends an EPS bearer creation success response to the MME.

In another embodiment (Embodiment 7), a DeNB currently serving a UE and an RN currently serving the UE notify their used DRB identifiers and logical channel identifiers to each other, that is, perform distributed management.

Figure 15:
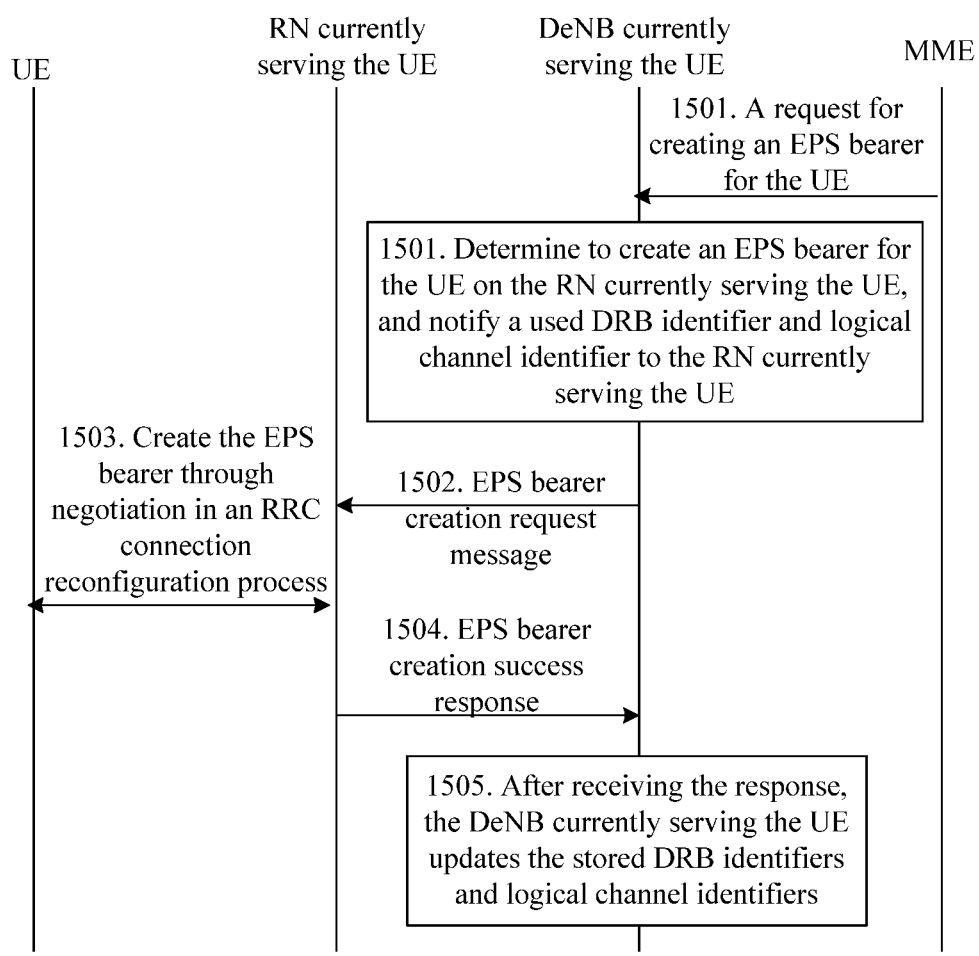
FIG. 15 is a flowchart of a method for a DeNB currently serving a UE to create an EPS bearer for the UE in a CA manner according to Embodiment 7 of the present invention.

FIG. 15 is a flowchart of a method for a DeNB currently serving a UE to create an EPS bearer for the UE in a CA manner according to Embodiment 7 of the present invention. The method includes the following steps.

Step 1501: A DeNB currently serving a UE receives an EPS bearer creation request from an MME, determines to create an EPS bearer for the UE on an RN currently serving the UE, and notifies a DRB identifier and/or logical channel identifier used by the DeNB to the RN currently serving the UE.

Step 1502: The DeNB currently serving the UE sends an EPS bearer creation request to the RN currently serving the UE, where the request includes the used DRB identifier and/or logical channel identifier.

Step 1503: The RN currently serving the UE and the UE create an EPS bearer for the UE in an RRC connection reconfiguration process in which the UE sets correspondence between an identifier of a CC Group to which the EPS bearer belongs and a DRB identifier and/or logical channel identifier of the EPS bearer; and corresponding to the CC Group, different access stratum entities are set to multiplex or demultiplex data, and concatenate, segment or reassemble a packet.

When allocating a DRB identifier and/or logical channel identifier, the RN does not use the DRB identifier and/or logical channel identifier used by the DeNB currently serving the UE.

Step 1504: The RN currently serving the UE sends an EPS bearer creation success response to the DeNB currently serving the UE, where the response carries the DRB identifier and/or the logical channel identifier allocated to the UE and applied to the EPS bearer.

Step 1505: After receiving the EPS bearer creation success response, the DeNB currently serving the UE updates stored DRB identifier and/or logical channel identifier.

In another embodiment (Embodiment 8), a DeNB currently serving a UE and an RN currently serving the UE allocate DRB identifiers and/or logical channel identifiers semi-statically, and group all DRB identifiers and/or logical channel identifiers. The DeNB currently serving the UE and the RN currently serving the UE each use one of the groups. The following takes an example that the RN currently serving the UE sends a request to the DeNB currently serving the UE for illustration, and the converse is similar.

Figure 16:
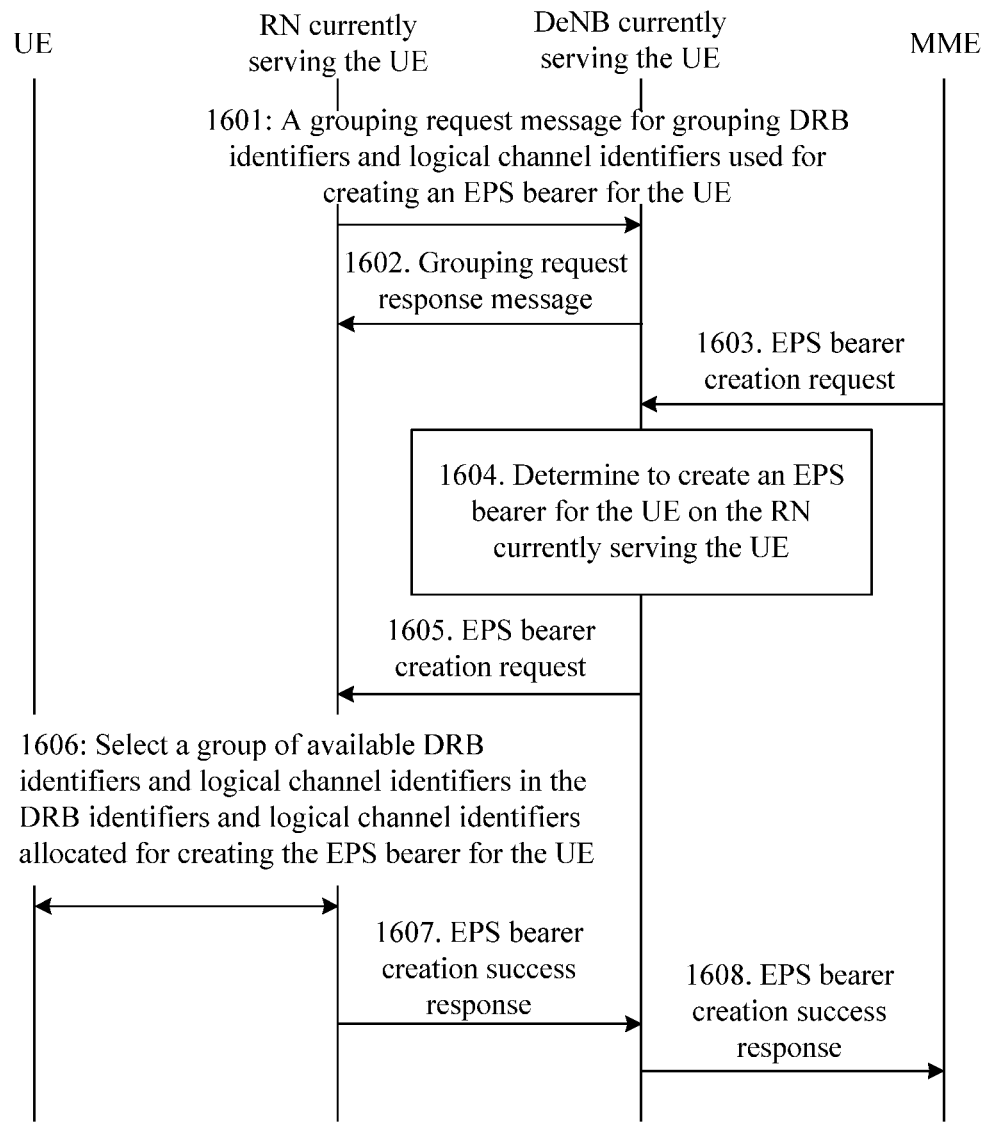
FIG. 16 is a flowchart of a method for a DeNB currently serving a UE to create an EPS bearer for the UE in a CA manner according to Embodiment 8 of the present invention.

FIG. 16 is a flowchart of a method for a DeNB currently serving a UE to create an EPS bearer for the UE in a CA manner according to Embodiment 8 of the present invention. The method includes the following:

Step 1601: An RN currently serving a UE sends a grouping request message to a DeNB currently serving the UE, where the message is a request for grouping DRB identifiers and/or logical channel identifiers used for creating an EPS bearer for the UE.

In this step, the request message may further carry a DRB identifier and/or logical channel identifier recommended and expected by the RN currently serving the UE.

Step 1602: The DeNB currently serving the UE sends a grouping indication message to the RN currently serving the UE, where the message carries a DRB identifier and/or logical channel identifier used when each of the DeNB currently serving the UE and the RN currently serving the UE creates an EPS bearer for the UE.

Step 1603: The DeNB currently serving the UE receives an EPS bearer creation request sent by an MME.

Step 1604: The DeNB currently serving the UE determines to create an EPS bearer for the UE on the RN currently serving the UE.

Step 1605: The DeNB currently serving the UE sends an EPS bearer creation request to the RN currently serving the UE.

Step 1606: The RN currently serving the UE selects a group of available DRB identifiers and/or logical channel identifiers among the DRB identifiers and/or logical channel identifiers allocated for creating the EPS bearer for the UE, and works with the UE to create the EPS bearer for the UE in an RRC connection reconfiguration process in which the UE sets correspondence between an identifier of a CC Group to which the EPS bearer belongs and a DRB identifier and/or logical channel identifier of the EPS bearer; and corresponding to the CC Group, different access stratum entities are set to multiplex or demultiplex data, and concatenate, segment or reassemble a packet.

Step 1607: The RN currently serving the UE sends an EPS bearer creation success response to the DeNB currently serving the UE.

Step 1608: The DeNB currently serving the UE forwards the EPS bearer creation success response to the MME.

It should be noted that, in this embodiment or in step 1604, when the DeNB currently serving the UE determines to create an EPS bearer for the UE on the RN currently serving the UE, the DeNB sends a grouping indication message to the RN; or, when sending an EPS bearer request message to the RN, the DeNB sends the grouping indication message to the RN. In this case, step 1601 and step 1602 in this embodiment may be cancelled.

In addition to the above method, in all embodiments of the present invention, the UE may determine a mapping relationship between the EPS bearer and a CC Group according to the CC Group in which a CC resides, where the CC is a source of an RRC message received for creating the EPS bearer. In this way, corresponding to the CC Group, different access stratum entities are set to multiplex or demultiplex data, and concatenate, segment or reassemble a packet.

In all embodiments of the present invention, when the DeNB (or RN) determines that an EPS bearer needs to be created for the UE on the RN (or DeNB), the essence of the foregoing embodiments describes the method about how the DeNB (or RN) notifies the RN (or DeNB) of the need to create the EPS bearer for the UE first, and how the RN (or DeNB) creates the EPS bearer for the UE in an RRC connection reconfiguration process.

It should be noted that, when the DeNB (or RN) determines that an EPS bearer needs to be created for the UE on the RN (or DeNB), the DeNB (or RN) may also work with the UE to create the EPS bearer for the UE on the RN (or DeNB) in an RRC connection reconfiguration process directly. Further, the DeNB (or RN) needs to notify the EPS bearer to the RN (or DeNB). In this manner, the DeNB (or RN) may clearly indicate, in an RRC connection reconfiguration message, a cell group (or node) for creating the EPS bearer, or, by allocating a DRB ID and/or logical channel ID in the way described in Embodiment 8 of the present invention, implicitly notify the UE of a Cell Group (or node) for creating the EPS bearer, that is, the Cell Group (or node) corresponding to the EPS bearer. This method is especially suitable for an RN without an RRC function.

With the embodiments of the present invention, data transmission throughput of a UE at a cell edge can be improved, the difference between data transmission throughput of a UE at a cell edge and data transmission throughput of a UE at a cell center can be reduced, and service performance fairness between UEs is improved.

The foregoing descriptions are merely exemplary embodiments of the present invention, but are not intended to limit the present invention. Any modifications, equivalent replacements, or improvements made within the idea and principle of the present invention shall fall within the protection scope of the present invention.

What is claimed is:

1. A method for transmitting data in a carrier aggregation (CA) manner, the method comprising:
   determining, by a user equipment (UE) when transmitting or receiving data, a component carrier group (CC Group) corresponding to an identifier of an evolved packet system (EPS) bearer on an access stratum and that bears the data, wherein the CC Group is a CC set created for the UE by a site that creates the EPS bearer;
   determining, by the UE, an access stratum entity corresponding to the CC Group in at least two access stratum entities according to the CC Group; and
   processing the data on the access stratum entity corresponding to the CC Group.

2. The method according to claim 1, wherein processing the data on the access stratum entity corresponding to the CC Group comprises:
   demultiplexing or multiplexing the data on a media access control (MAC) layer corresponding to the CC Group; or
   concatenating, segmenting, or reassembling the data on a radio link control (RLC) layer corresponding to the CC Group.

3. The method according to claim 1, wherein the identifier of the EPS bearer on the access stratum is carried in a packet header of the data.

4. The method according to claim 1, further comprising:
   obtaining, by the UE, an identifier of a first EPS bearer on the access stratum and an identifier of a second EPS bearer on the access stratum, wherein the first EPS bearer is created by a first base station for the UE based on a first CC Group and the second EPS bearer is created by a second base station for the UE based on a second CC Group; and
   setting, by the UE, correspondence, wherein the correspondence comprises the identifier of the first EPS bearer on the access stratum corresponds to an identifier of the first CC Group and the identifier of the second EPS bearer on the access stratum corresponds to an identifier of the second CC Group.

5. The method according to claim 4, further comprising:
   allocating, by the first base station, the identifier of the second EPS bearer on the access stratum and sending the identifier of the second EPS bearer on the access stratum to the second base station by using an EPS bearer creation request; and creating, by the second base station, the second EPS bearer for the UE by using the identifier of the second EPS bearer on the access stratum; or
   sending, by the first base station, a request message for creating an EPS bearer for the UE to the second base station, wherein the request message for creating an EPS bearer carries an identifier, used by the first base station, of the EPS bearer on the access stratum; and creating, by the second base station, the second EPS bearer for the UE by using an identifier other than the identifier, used by the first base station, of the EPS bearer on the access stratum; or sending, by the first base station, a grouping indication message to the second base station, wherein the grouping indication message carries an identifier group, determined by the first base station, of the EPS bearer of the second base station on the access stratum; and creating, by the second base station, the second EPS bearer for the UE by using an identifier in the identifier group of the EPS bearer of the second base station on the access stratum.

6. The method according to claim 5, further comprising determining, by the first base station, an identifier group of the EPS bearer of the first base station on the access stratum, and creating, by the first base station, the first EPS bearer for the UE by using an identifier in the identifier group of the EPS bearer of the first base station on the access stratum.

7. The method according to claim 5, wherein, before the first base station sends the grouping indication message to the second base station, the method further comprises sending, by the second base station, a grouping request message to the first base station to request grouping identifiers of the EPS bearer on the access stratum among the first base station and the second base station for use.

8. A user equipment (UE) for transmitting data in a carrier aggregation (CA) manner, comprising:
a processor;
a non-transitory computer readable medium connected to the processor and having stored thereon instructions that, when executed, cause the processor to:
determine, when transmitting or receiving data, a component carrier group (CC Group) corresponding to an identifier of an evolved packet system (EPS) bearer on an access stratum and that bears the data, wherein the CC Group is a CC set created for the UE by a site that creates the EPS bearer, and determine an access stratum entity corresponding to the CC Group in at least two access stratum entities according to the CC Group identifier; and
determine the access stratum entity corresponding to the CC Group in the at least two access stratum entities to process the data.

9. The UE according to claim 8, wherein the non-transitory computer readable further has stored thereon instructions that, when executed, cause the processor to at least one of:
demultiplex or multiplex the data on a media access control (MAC) layer corresponding to the CC Group; or
concatenate, segment, or reassemble the data on a radio link control (RLC) layer corresponding to the CC Group.

\* \* \* \* \*

UNITED STATES PATENT AND TRADEMARK OFFICE
CERTIFICATE OF CORRECTION

PATENT NO. : 9,584,274 B2  
APPLICATION NO. : 14/951269  
DATED : February 28, 2017  
INVENTOR(S) : Junren Chang et al.

It is certified that error appears in the above-identified patent and that said Letters Patent is hereby corrected as shown below:

In the Claims

In Column 20, Lines 11-12, Claim 8, delete "CC Group identifier; and" and insert --CC Group; and--.

Signed and Sealed this
Twelfth Day of November, 2019

Andrei Iancu
*Director of the United States Patent and Trademark Office*